(12) United States Patent
Sueoka et al.

(10) Patent No.: US 9,181,035 B2
(45) Date of Patent: Nov. 10, 2015

(54) RECTANGULAR THIN PANEL CONVEYANCE UNIT

(75) Inventors: Masaaki Sueoka, Osaka (JP); Takaya Niimi, Osaka (JP)

(73) Assignee: KYORAKU CO., LTD., Tokyo (JP)

( * ) Notice: Subject to any disclaimer, the term of this patent is extended or adjusted under 35 U.S.C. 154(b) by 126 days.

(21) Appl. No.: 14/114,670

(22) PCT Filed: Apr. 29, 2012

(86) PCT No.: PCT/JP2012/002942
§ 371 (c)(1),
(2), (4) Date: Feb. 12, 2014

(87) PCT Pub. No.: WO2012/147373
PCT Pub. Date: Nov. 1, 2012

(65) Prior Publication Data
US 2014/0144752 A1    May 29, 2014

(30) Foreign Application Priority Data

Apr. 29, 2011 (JP) .................................. 2011-102600
May 31, 2011 (JP) .................................. 2011-122200

(51) Int. Cl.
*B65G 1/00* (2006.01)
*B65G 17/34* (2006.01)
(Continued)

(52) U.S. Cl.
CPC ................. *B65G 17/34* (2013.01); *B65D 19/06* (2013.01); *B65D 19/18* (2013.01); *B65D 57/00* (2013.01);
(Continued)

(58) Field of Classification Search
CPC ........... B65G 1/00; B65D 2519/06641; B65D 2519/00069; B65D 2519/00273; B65D 2519/00004; B65D 2519/00258; B65D 2519/00313; B65D 19/06; B65D 5/0055
USPC .............. 198/347.1, 463.1; 229/198.1, 198.2; 220/4.29, 4.32; 206/386, 600
See application file for complete search history.

(56) References Cited

U.S. PATENT DOCUMENTS 3,664,570 A * 5/1972 Kupersmit .................... 206/386
4,936,451 A * 6/1990 Shuert ........................... 206/386
(Continued)

FOREIGN PATENT DOCUMENTS

DE           200 10 335       9/2000
DE           103 06 484       8/2004
(Continued)

OTHER PUBLICATIONS

International Search Report, dated Jul. 24, 2012, which issued during the prosecution of International Patent Application No. PCT/JP2012/002942.
(Continued)

*Primary Examiner* — James R Bidwell
(74) *Attorney, Agent, or Firm* — Troutman Sanders LLP

(57) ABSTRACT

The thin panel conveyance unit used for piling up and conveying a plurality of rectangular thin panels includes: resin cushion spacers inserted between the rectangular thin panels, each resin cushion spacer having a load-receiving upper surface for receiving load of the rectangular thin panel disposed above and a placement lower surface placed on an upper surface of the rectangular thin panel disposed below, and having an end part provided with a positioning body for the resin cushion spacer; a pallet having an upper surface configured to allow the rectangular thin panels to be piled up thereon; and a protection sleeve surrounding the piled rectangular thin pallets. The upper surface of the pallet is provided with a peripheral groove in which the protection sleeve can be fitted.

19 Claims, 12 Drawing Sheets

(51) Int. Cl.
  *B65D 85/48* (2006.01)
  *B65D 19/06* (2006.01)
  *B65D 57/00* (2006.01)
  *B65D 19/18* (2006.01)
  *B65D 71/00* (2006.01)
  *B65D 81/107* (2006.01)

(52) U.S. Cl.
  CPC .......... *B65D 71/0096* (2013.01); *B65D 81/107* (2013.01); *B65D 85/48* (2013.01); *B65D 2519/00034* (2013.01); *B65D 2519/00069* (2013.01); *B65D 2519/0081* (2013.01); *B65D 2519/0082* (2013.01); *B65D 2519/00159* (2013.01); *B65D 2519/00174* (2013.01); *B65D 2519/00268* (2013.01); *B65D 2519/00288* (2013.01); *B65D 2519/00318* (2013.01); *B65D 2519/00338* (2013.01); *B65D 2519/00497* (2013.01); *B65D 2519/00502* (2013.01); *B65D 2519/00661* (2013.01); *B65D 2519/00711* (2013.01); *B65D 2519/00975* (2013.01); *B65D 2571/00037* (2013.01); *B65D 2571/00043* (2013.01); *B65D 2571/00074* (2013.01)

(56) References Cited

U.S. PATENT DOCUMENTS

| | | | | |
|---|---|---|---|---|
| 6,994,226 | B2* | 2/2006 | Shuert | 220/4.29 |
| 8,887,914 | B2* | 11/2014 | Allegretti et al. | 206/386 |
| 8,950,136 | B2* | 2/2015 | Haidvogl | 52/294 |
| 2002/0108842 | A1 | 8/2002 | Bonora et al. | 198/836.1 |
| 2005/0280811 | A1* | 12/2005 | Sandell | 356/246 |
| 2006/0005875 | A1 | 1/2006 | Haberlein | |

FOREIGN PATENT DOCUMENTS

| | | |
|---|---|---|
| EP | 1 860 040 | 11/2007 |
| JP | 2003-200962 A | 7/2003 |
| JP | 2005-239242 | 9/2005 |
| JP | 2006-032978 A | 2/2006 |
| JP | 2009-298421 | 12/2009 |
| JP | 2011-051609 A | 3/2011 |
| JP | 2011-063305 A | 3/2011 |
| WO | 2006/101289 | 9/2006 |

OTHER PUBLICATIONS

Supplementary European Search Report dated Jan. 16, 2015, which issued during prosecution of European Application No. 12 77 6415, which corresponds to the present application.

* cited by examiner

RECTANGULAR THIN PANEL CONVEYANCE UNIT

CROSS-REFERENCE TO RELATED APPLICATIONS

This is a U.S. national phase application under 35 U.S.C. §371 of International Patent Application No. PCT/JP2012/002942, filed on Apr. 29, 2012, and claims benefit of priority to Japanese Patent Application Nos. 2011-102600, filed Apr. 29, 2011, and 2011-122200, filed May 31, 2011. The International Application was published on Nov. 1, 2012 as International Publication No. WO 2012/147373 under PCT Article 21(2). The entire contents of these applications are hereby incorporated by reference.

TECHNICAL FIELD

The present invention relates to a rectangular thin panel conveyance unit. More specifically, the present invention relates to a rectangular thin panel conveyance unit that can certainly prevent, when a plurality of rectangular thin panels is piled up and conveyed, the rectangular thin panel from being scratched or damaged during the conveyance and can store the rectangular thin panels stably for a long time.

BACKGROUND ART

A module has conventionally been used for storing and conveying fragile, heavy, rectangular thin panels, such as solar panels, in a manner that the panels are piled up vertically without contact.

Patent Document 1 discloses an example thereof.

This module includes: a supporting surface for supporting a rectangular thin panel from below; and a mold-product member connected to the supporting surface in a manner of extending outward from the supporting surface and vertically transmitting the weight of the rectangular thin panel. This module has a recess and a protrusion, which can be engaged with each other, on upper and lower parts of this mold-product member.

With such modules, it is possible to pile up the rectangular thin panels vertically without contact as follows: The modules are put on four corners of a rectangular thin panel with its periphery supported by a rectangular annular outer frame. Then, the rectangular thin panel is disposed on the supporting surface via the outer frame. Next, at each corner, the recess at the lower part of the mold-product member of another module is fitted to the protrusion at the upper part of the mold-product member of the module already disposed. Similarly, the next rectangular thin panel is supported by four modules. Without the outer frame, however, the modules cause the following program when the four corners of the rectangular thin panel are disposed on the supporting surface of each module. That is, the rectangular thin panel can be scratched or damaged during the conveyance.

More specifically, for example, the rectangular thin panel vibrates when: the piled rectangular thin panels are transported in a truck or the pallet runs on an uneven road. In the occurrence of such vibration, the substantially central part of the rectangular thin panel has the maximum amplitude vertically. Here, each corner part of the rectangular thin panel disposed on the supporting surface of the module is a free end. Therefore, as compared with the case where each corner part becomes a fixed end due to the use of an outer frame, the vibration at the central part of the rectangular thin panel tends to be amplified. As a result, due to the vibration of each corner part of the rectangular thin panel or due to the contact between each corner part of the rectangular thin panel and the upper and lower supporting parts, the rectangular thin panel may be scratched or, in some cases, damaged. In view of this, the insertion of a cushion spacer having a cushioning function with a predetermined size between a lower surface of the upper rectangular thin panel and an upper surface of the lower rectangular thin panel is suggested. This cushion spacer serves as an alternative to the modules disposed at the four corners of the rectangular thin panel when the rectangular thin panels are piled up. There are various configurations of the rectangular thin panel. For example, the upper surface of the solar panel is generally provided with a power distribution box and/or cord. On this occasion, a clearance is needed between the solar panels to be piled up on each other or the size of the cushion spacer needs to be restricted. The restriction of the size of the cushion spacer is to reduce the load receiving area of the rectangular thin panel. As this load receiving area is smaller (especially as the size of the cushion spacer located lower is restricted more), the rectangular thin panel is more easily crushed due to the increasing weight of the rectangular thin panel located above. Meanwhile, when the cushion spacers are vertically adjacent to each other via the piled rectangular thin panel, the upper cushion spacer can be moved relative to the lower cushion spacer in a long-side or short-side direction of the rectangular thin panel. In this case, it is difficult to stably position the rectangular thin panel supported by the cushion spacer. Therefore, for example, the load may be shifted due to the vibration during the conveyance, resulting in that the rectangular thin panel may be damaged. For this reason, it is necessary to restrict the relative movement between the cushion spacers adjacent to each other vertically. However, there is no choice but to provide such a positioning portion outside the rectangular thin panel, i.e., at a portion that does not receive the load of the rectangular thin panel. In this case, a shear force is generated vertically in the cushion spacer, specifically between the portion that receives the load of the rectangular thin panel and the portion that does not receive the load of the rectangular thin panel. This may result in that the structural integrity of the cushion spacer made of resin is degraded over time.

In this regard, Patent Document 2 discloses a housing unit for the rectangular thin panel utilizing such cushion spacers. More specifically, this conveyance unit forms one unit by alternately piling up a cushion member and a glass plate when housing the glass plates in a pallet. Here, the glass plate is a glass plate having a plurality of resin frames, which is a window glass for an automobile. The cushion member includes a self-adhesive member on a surface thereof that abuts on the glass plate. The unit is disposed on a bottom-receiving member formed on a bottom of the pallet via the cushion member having the self-adhesive member. Next, the cushion member including the self-adhesive member is disposed on an upper surface of the unit. After that, an upper pressing member is disposed on this cushion member. Then, the bottom-receiving member and the upper pressing member are fastened with a predetermined binding unit.

In such a housing unit, the glass plates piled up between the bottom-receiving member and the upper pressing member are fastened with the predetermined binding unit. Thus, the glass plates can be housed without the load shift. However, if the target to be housed is not the transparent glass plate having the resin frame but an opaque or semi-transparent rectangular thin panel without a frame, the technical problems as follows are found when the panel is housed.

First, the positioning of the cushion spacer on the thin panel is difficult.

More specifically, the cushion spacer is disposed on the upper surface of the glass plate at each of the four corners of the rectangle with a predetermined space from each other via the self-adhesive member. However, at each of the four corners of the rectangle, the cushion spacers are necessarily piped up in a columnar shape, while the glass plate is interposed between the cushion spacers. If the glass plate is transparent, the position of the cushion spacer positioned below the glass plate can be observed through the glass plate. Therefore, it is easy to pile up the cushion spacers in the columnar shape. In the case of an opaque or semi-transparent rectangular thin panel, however, it is difficult to position the next cushion spacer via the rectangular thin panel right above the cushion spacer below the rectangular thin panel. In this case, therefore, as the number of rectangular thin panels to be piled up increases, the cushion spacer to be adjacent thereto vertically is displaced. As a result, the risk of the load shift is increased. In particular, the load shift is more likely to be caused if the displacement occurs in a direction where the size of the rectangle formed by four cushion spacers becomes smaller.

Second, it is difficult to pile up or unload the thin panels efficiently. More specifically, four cushion spacers are needed to pile up one glass plate. The cushion spacers need to be positioned at predetermined positions of the glass substrate. In the case of piling up the rectangular thin panels without frames, the sides of the rectangular thin panels piled up are exposed. Therefore, the piling up requires extra attention. Thus, efficient piling up is difficult. This similarly applies when the piled thin panels are unloaded.

Patent Document 1: JP-A-2006-32978
Patent Document 2: JP-A-2003-200962

SUMMARY OF THE INVENTION

Problems to be Solved by the Invention

In view of the above technical problems, an object of the present invention is to provide a rectangular thin panel conveyance unit that can certainly prevent, when the rectangular thin panels are piled up and conveyed, the rectangular thin panel from being scratched and damaged during the conveyance and can store the rectangular thin panels stably for a long time. Further, in view of the above technical problems, an object of the present invention is to provide a rectangular thin panel conveyance unit that can, when the rectangular thin panels are piled up and conveyed, facilitate the positioning of the cushion spacer on the upper surface of the rectangular thin panel and can pile up the thin panels safely and efficiently.

Solutions to the Problems

To solve the problems, a thin panel conveyance unit according to the present invention is a thin panel conveyance unit used for piling up and conveying a plurality of rectangular thin panels, the thin panel conveyance unit including: resin cushion spacers inserted between the rectangular thin panels, each resin cushion spacer having a load-receiving upper surface configured to receive load of the rectangular thin panel disposed above and a placement lower surface configured to be placed on an upper surface of the rectangular thin panel disposed below, and having an end part provided with a positioning body for the resin cushion spacer; a pallet having an upper surface configured to allow the rectangular thin panels to be piled up thereon; and a protection sleeve configured to surround the piled rectangular thin pallets. The upper surface of the pallet is provided with a peripheral groove in which the protection sleeve can be fitted.

The thin panel conveyance unit may include at least two resin cushion spacers configured to be inserted between the rectangular thin panels. Each resin cushion spacer may have a long narrow shape and be longer than one side of the rectangular thin panel, and the upper surface of the pallet may be provided with the peripheral groove in which the protection sleeve can be fitted so that an inner surface of the protection sleeve abuts on an end surface of the positioning body.

According to the rectangular thin panel conveyance unit with the above structure, at least two resin cushion spacers may be positioned in approximately parallel to one side of the rectangular thin panel at predetermined positions of an upper surface of an opaque or semi-transparent rectangular thin panel. In this case, the resin cushion spacers are disposed at predetermined intervals in a direction of the other side based on the weight, rigidity, and the like of the thin panel so that the thin panel is not damaged due to the vibration during the conveyance. In this case, a positioning body provided at an end part of the resin cushion spacers below the rectangular thin panel protrudes outward from the opposite other sides of the rectangular thin panel. In this configuration, the resin cushion spacers below the rectangular thin panel are positioned on the upper surface of the rectangular thin panel with a predetermined space therebetween. Thus, the positioning body protruding from the rectangular thin panel can be used as a mark. The positioning body of the next corresponding resin cushion spacer to be positioned is disposed on this mark. This facilitates the positioning of the resin cushion spacer. As a result, the positioning can be performed without the risk of causing the displacement between the resin cushion spacers vertically adjacent to each other. On the other hand, even in the case of piling up the rectangular thin panels on the upper surface of the pallet without the frame, the rectangular thin panels are protected by covering the piled rectangular thin panels with protection sleeves. Additionally, by utilizing the protection sleeves, a peripheral groove in which the protection sleeve can be fitted is provided on the upper surface of the pallet so that an inner surface of the protection sleeve abuts on an end surface of the positioning body. This restricts the movement in a direction of one side of the resin cushion spacer. Thus, the risk of load shift during the conveyance is reduced. As a result, when the plural rectangular thin panels are piled up on each other and conveyed, the positioning of the cushion spacers on the upper surface of the rectangular thin panel can be facilitated and the safe and efficient piling up becomes possible.

Moreover, each end part may be provided with the positioning body for the resin cushion spacer. The load supporting upper surface and the placement lower surface may be provided between the positioning bodies. A predetermined clearance may be provided between an upper surface of the positioning body of the lower resin cushion spacer and a lower surface of the positioning body of the upper resin cushion spacer in the resin cushion spacers vertically adjacent to each other via the rectangular thin panel. The at least two resin cushion spacers may be positioned on the upper surface of the rectangular thin panel at predetermined intervals in a direction of the other side in a manner that the positioning body protrudes outward in approximately parallel to one side of the rectangular thin panel from the opposite other sides.

Furthermore, the resin cushion spacer may have a long narrow shape and be longer than a short side of the rectangular thin panel. The positioning bodies of the resin cushion spacers vertically adjacent to each other via the rectangular thin panel may have a portion where mutual engagement is possible and a predetermined clearance may be provided between an upper surface of the positioning body of the lower resin cushion spacer and a lower surface of the positioning body of the upper resin cushion spacer.

According to the rectangular thin panel conveyance unit with the above structure, the resin cushion spacers are disposed on, for example, predetermined positions of the upper surface of a conveyance pallet. Then, the lower surface of the rectangular thin panel to be conveyed is supported from below by a load-receiving upper surface of the resin cushion spacer. In this configuration, the rectangular thin panel is disposed on the resin cushion spacer. Subsequently, a placement lower surface of the next resin cushion spacer is placed on the upper surface of the rectangular thin panel. Thus, the placement of the rectangular thin panel is repeated. As a result, the weight of the plural rectangular thin panels is supported by the resin cushion spacers. In this manner, the plural rectangular thin panels are piled up vertically. As a result, the piled rectangular thin panels can be conveyed for each conveyance pallet using, for example, a forklift. In this case, the end part of the resin cushion spacer is provided with the positioning body. Thus, the resin cushion spacers are vertically adjacent to each other via the rectangular thin panel. Through the portions that can be engaged with each other between the resin cushion spacers, the movement of the upper resin cushion spacer relative to the lower resin cushion spacer is restricted. When the plural rectangular thin panels piled are transported in a trunk or a folk lift runs on an uneven road, for example, vibration is caused and transmitted to the panels. However, since the resin cushion spacer is placed between the rectangular thin panels, the vibration is relieved and the plural rectangular thin panels are positioned. As a result, the plural rectangular thin panels can be conveyed safely and stably. Meanwhile, in the case of using such a cushioning function, when in storage, the resin cushion spacer positioned lower is more likely to be crushed over time. As a result, the vertical shear force is generated in the resin cushion spacer between the portion that receives the load of the rectangular thin panel and the end that does not receive the load of the rectangular thin panel. This may result in that the structural integrity of the cushion spacer made of resin is degraded over time. However, such vertical shear force is relieved as follows: The vertical shear force is relieved by providing a predetermined clearance between the upper surface of the positioning body of the lower resin cushion spacer and the lower surface of the positioning body of the upper resin cushion spacer in the resin cushion spacers vertically adjacent to each other via the rectangular thin panel. As a result, the plural rectangular thin panels can be stored stably for a long time. As thus described, according to the rectangular thin panel conveyance unit, the scratch or damage of the rectangular thin panel can be certainly prevented when the rectangular thin panels are piled up on each other and conveyed. Thus, the rectangular thin panels can be stored stably for a long time.

Each end part may also be provided with the positioning body for the resin cushion spacer, and the load supporting upper surface and the placement lower surface may be provided between the positioning bodies.

Moreover, the thin panel conveyance unit may include the pallet for having the rectangular thin panels piled up on the upper surface thereof, and the protection sleeve for surrounding the piled rectangular thin pallets. The upper surface of the pallet may be provided with the peripheral groove in which the protection sleeve can be fitted so that an inner surface of the protection sleeve abuts on an end surface of the positioning body.

Furthermore, an end part of the load supporting upper surface may be provided with a stepped part that can be abutted on a side surface of the rectangular thin panel to restrict movement in a short-side direction of the rectangular thin panel. The upper surface of the positioning body may be provided outside the stepped part, and the lower surface may be provided with a recess recessed upward from the placement lower surface.

In addition, an end part of the load supporting upper surface may also be provided with a stepped part that can be abutted on a side surface of the rectangular thin panel to restrict movement in a short-side direction of the rectangular thin panel, the upper surface of the positioning body may be provided outside the stepped part, and the upper surface may be provided with a recess recessed downward from the load supporting upper surface. Moreover, the portion where mutual engagement is possible may also include a protrusion protruding from the upper surface or the lower surface of the positioning body and a recess recessed from the lower surface or the upper surface of the positioning body, the protrusion and the recess being able to engage with each other to restrict movement in a long-side direction of the rectangular thin panel, and height of the protrusion and/or the recess may be adjusted so that a predetermined clearance be provided between a top of the protrusion and a bottom of the recess at the engagement.

Furthermore, the portions that can engage with each other may also include a first protrusion protruding from the upper surface or the lower surface of the positioning body and a second protrusion protruding from the upper surface or the lower surface, a peripheral side surface of the second protrusion being able to abut on a peripheral side surface of the first protrusion to restrict movement in a long-side direction of the rectangular thin panel, and heights of the first protrusion and the second protrusion may be adjusted so that a predetermined clearance is provided in the resin cushion spacers vertically adjacent to each other via the rectangular thin panel, between a top of the first protrusion protruding from the upper surface of the lower resin cushion spacer or the lower surface of the lower resin cushion spacer and the lower surface of the upper resin cushion spacer or the upper surface of the lower resin cushion spacer and between a top of the second protrusion protruding from the lower surface of the upper resin cushion spacer or the upper surface of the lower resin cushion spacer and the upper surface of the lower resin cushion spacer or the lower surface of the upper resin cushion spacer.

In addition, the cushion spacer may also be made of foamed resin by solid integral molding and have an expansion ratio of such a degree that a desired cushioning function is exerted on the rectangular thin panel. Moreover, the cushion spacer may also include a pair of thermoplastic resin plates, peripheral parts of the pair of thermoplastic resin plates are attached to each other to form a side peripheral surface with a sealed hollow portion therein, each of the pair of thermoplastic resin plates may have a plurality of dents in an outer surface, where the dents taper down inwardly to project on an inner surface side, the dents may have butt planar portions at the narrowest portion, the pair of thermoplastic resin plates is welded to each other in a manner that the planar portions of the corresponding dents are disposed back to back, thereby forming an annular rib extending between the both plates, and the number of, and/or thickness of the annular ribs may be determined to such a degree that a desired cushioning function is exerted on the rectangular thin panel.

Furthermore, the rectangular thin panel may be a solar panel and the predetermined clearance may be 5 mm or less.

Moreover, at least two cushion spacers may be disposed line-symmetrically with respect to a line-symmetric axis that is parallel to a short-side direction of the rectangular thin panel.

BEST MODE FOR CARRYING OUT THE INVENTION

An embodiment of a thin panel conveyance unit 10 according to the present invention is hereinafter described with reference to the drawings. In this embodiment, a rectangular solar panel P is described as an example of the thin panel. The solar panel P has cells connected in series. The solar panel P is shaped like a thin plate and is exposed without being protected by a resin, reinforced glass, or metal frame. More specifically, the solar panel P has a silicon cell embedded between a glass layer and a plastic layer or between glass layers. The solar panel P has an opaque or semi-transparent multilayer structure. The solar panel P has a thickness of several millimeters, an area of several square meters, and a weight of 10 to 30 kg. The solar panel P is a precise and fragile structure. The solar panel P has an upper surface generally provided with a power source box 101 and a cord connected thereto. Therefore, it is difficult to pile up the solar panels P in a surface contact manner.

As depicted in FIG. 1, the conveyance unit 10 is to convey the solar panels P piled up on each other. This conveyance unit 10 includes a rectangular pallet 12, a protection sleeve 14 fixed to the rectangular pallet 12 and having a rectangular section, and a cushion spacer 100 inserted between the piled solar panels P. In FIG. 1, the protection sleeve 14 and the piled cushion spacers 100 are omitted for simply illustrating the inner structure. As depicted in FIG. 1 and FIG. 2, the rectangular pallet 12 has an upper surface 22 to which the protection sleeve 14 and four corner-holding members 18, which are described later, are fixed. The rectangular pallet 12 has a peripheral groove 24 along the periphery of the upper surface 22. Therefore, a lower end part 108 of the protection sleeve 14 can be engaged with this peripheral groove 24. The lower end parts of the four corner-holding members 18 to be described later can be engaged with the peripheral groove 24 in a manner that the corner-holding members 18 are set to the four corners of the solar panels P to be piled up from the outside. The rectangular pallet 12 is provided with fork insertion openings 13 for the forklift used for the conveyance. The rectangular pallet 12 is preferably made of resin from the aspect of securing the strength. The resin material of the rectangular pallet 12 is thermoplastic resin. Examples of the thermoplastic resin include olefin-based resins such as polyethylene and polypropylene, and amorphous resin. More specifically, the thermoplastic resin is a homopolymer of olefins such as ethylene, propylene, butene, isoprene pentene, or methyl pentene, or polyolefin as a copolymer (for example, polypropylene or high-density polyethylene). The rectangular pallet 12 can be molded by a known appropriate molding method such as vacuum molding, blow molding, or injection molding.

As depicted in FIG. 1 and FIG. 2, the cushion spacer 100 is made of resin and has a long narrow shape. This cushion spacer 100 has a material and a structure that can relieve the vibration applied to the piled solar panels P during the conveyance. More specifically, the resin material of the cushion spacer 100 is thermoplastic resin. Examples of this thermoplastic resin include olefin-based resin such as polyethylene and polypropylene, and amorphous resin such as polystyrene. More specifically, the thermoplastic resin is a homopolymer of olefins such as ethylene, propylene, butene, isoprene pentene, or methyl pentene, or polyolefin as a copolymer (for example, polypropylene or high-density polyethylene). The cushion spacer 100 is made of foamed resin by solid integral molding of foamed bead. The cushion spacer 100 has an expansion ratio of such a degree that a desired cushioning function is exerted on the solar panel P. For example, the expansion ratio of the cushion spacer 100 is 10 times to 40 times.

In a modified example, the cushion spacer 100 may have a hollow structure formed by a pair of thermoplastic resin plates (not shown). More specifically, the peripheral parts of the pair of thermoplastic resin plates are attached to each other to form a side peripheral surface with a sealed hollow portion formed therein. The pair of thermoplastic resin plates has on the outer surface, a plurality of dents (not shown) that taper down inwardly to project on the inner surface side. The dents have butt planar portions at the narrowest portion. Therefore, the pair of thermoplastic resin plates is welded to each other in a manner that the planar portions of the corresponding dents are disposed back to back. Thus, an annular rib (not shown) extending between the both plates is formed. In this case, the number of, and/or the thickness of the annular ribs is determined to such a degree that the desired cushioning function is exerted on the solar panel P.

As depicted in FIG. 1, two cushion spacers 100 are disposed line-symmetrically with respect to a line-symmetrical axis X-X that is parallel to a short side of the solar panel P. The number of, and the intervals of the cushion spacers 100 may be determined as appropriate so that the cushion spacers 100 can stably support the solar panel P. As depicted in FIG. 3, the cushion spacer 100 has a long narrow shape, which is substantially a cube. The length of the cushion spacer 100 in the long-side direction thereof is longer than the short side of the solar panel P and shorter than the short side of the rectangular pallet 12. Thus, as described later, when the cushion spacer 100 is inserted between the solar panels P, a positioning body 102 protrudes from each long edge of the solar panel P. The positioning body 102 protruding from the solar panel P is used as a mark. In other words, the positioning body 102 of the corresponding cushion spacer 100 to be positioned next is disposed on the mark. This facilitates the positioning of the cushion spacer 100. Accordingly, the positioning can be performed without the risk of causing the displacement between the cushion spacers 100 vertically adjacent to each other. Additionally, the movement between the cushion spacers 100 vertically adjacent to each other is restricted. In other words, the movement of the upper cushion spacer 100 relative to the lower cushion spacer 100 in the long-side direction of the solar panel P is restricted via an engagement portion 103 of the positioning body 102. On this occasion, the protection sleeve 14 can be attached around the piled solar panels P.

The width (W) of the cushion spacer 100 may be determined as appropriate based on the relation with the number of cushion spacers 100 disposed. As the width of the cushion spacer 100 is smaller, the amount of crushes of the cushion spacer 100 becomes larger due to the weight of the solar panel P. Therefore, the amount of crushes of the cushion spacer 100 is set to a predetermined one. The amount may be restricted to the amount that achieves the sufficient cushioning function relative to the solar panel P while considering the space for disposing the cushion spacer 100 on the upper surface of the solar panel P. In addition to the width (W) of the cushion spacer 100, the height (H) affects the cushioning function on the solar panel P. The solar panel P is stored in the restricted space. Therefore, especially when the height (H) of the cushion spacer 100 is too large, the number of panels that can be piled up is restricted. Therefore, it is desirable that the cushion spacer 100 has the height (H) as small as possible while having the cushioning function secured by the width (W) or the expansion ratio.

As depicted in FIG. 3 and FIG. 4, the cushion spacer 100 has a load-receiving upper surface 112 that receives the load of the solar panel P disposed on the upper side and a placement lower surface 106 placed on the upper surface of the solar panel P disposed on the lower side. The end part 108 of the cushion spacer 100 is provided with the positioning body 102 of the resin cushion spacer 100. The positioning bodies 102 of the resin cushion spacers 100 vertically adjacent to each other via the solar panel P have the engagement portion 103 that allows the mutual engagement. Additionally, a predetermined clearance is provided between the upper surface 112 of the positioning body 102 of the lower resin cushion spacer 100 and the lower surface 114 of the positioning body 102 of the upper resin cushion spacer 100. More specifically, each end part 108 is provided with the positioning body 102 of the resin cushion spacer 100. Between the positioning bodies 102, a load-receiving upper surface 113 and the placement lower surface 106 are provided. The end part 108 of the load-receiving upper surface 113 is provided with a stepped part 110 that can be abutted on the side surface of the solar panel P. Therefore, these components restrict the movement of the solar panel P in the short-side direction thereof. The distance between the stepped parts 110 may be determined to such a degree that several millimeters of play are allowed between the side surface of the solar panel P and the corresponding stepped part 110 as long as the movement of the solar panel P in the short-side direction is restricted. On this occasion, the convenience when the solar panel P is placed on the load-receiving upper surface 112 is considered.

As depicted in FIG. 5, the upper surface 112 of the positioning body 102 is provided outside the stepped part 110. A recess 116 recessed upward from the placement lower surface 106 is provided for the lower surface 114 of the positioning body 102. Therefore, in the resin cushion spacers 100 vertically adjacent to each other via the solar panel P, a predetermined clearance C1 is secured between the lower surface 114 of the positioning body 102 of the upper resin cushion spacer 100 and the upper surface 112 of the positioning body 102 of the lower resin cushion spacer 100. The resin cushion spacer 100 positioned lower is crushed more easily due to the weight of the solar panel P. However, in the resin cushion spacer 100, the load-receiving upper surface 112 that receives the weight of the solar panel P is crushed but the positioning body 102 that does not receive the weight of the solar panel P is not crushed. Although the vertical shear force is generated between the both, this shear force can be relieved. Therefore, the structural integrity of the resin cushion spacer 100 can be maintained. As a result, the predetermined clearance C1 may be determined from this viewpoint, and is preferably 5 mm or less, for example. As a modified example, the upper surface 112 may be provided with the recess 116 recessed downward from the load-receiving upper surface 113.

The engagement portion 103 has a protrusion 118 and a recess 119. The protrusion 118 protrudes from the upper surface 112 of the positioning body 102. On the other hand, the recess 119 is recessed from the lower surface 114 of the positioning body 102 and can be engaged with the protrusion 118. More specifically, the protrusion 118 is cubic. Side surfaces 117 of the cube that face each other are abutted on the corresponding internal surfaces of the recess 119; as a result, the movement in any direction of the long-side direction of the solar panel P is restricted. The height of the protrusion 118 and/or the height of the recess 119 may be adjusted so that a predetermined clearance C2 is provided between the top of the protrusion 118 and the bottom of the recess 119 at the engagement. The clearance C2 is preferably 5 mm or less as described above.

As depicted in FIG. 1, the protection sleeve 14 has a section shaped like a letter of U. The lower end peripheral part of this protection sleeve 14 is detachably fixed to the rectangular pallet 12. The pair of protection sleeves 14 is fixed to the rectangular pallet 12 in a state that the open parts of the sections shaped like a letter of U face each other. The height of the protection sleeve 14 may be determined as appropriate based on the height of the solar panel P to be piled up. The material of the protection sleeve 14 is preferably cardboard or resin.

A mechanism 49 detachably fixes the protection sleeve 14 to the rectangular pallet 12. This mechanism 49 is described with reference to FIG. 6. The mechanism 49 is provided for each of side surfaces of the protection sleeve 14 that face each other. The mechanism 49 has a hook member 52 fixed to the outer surface of the protection sleeve 14 and a receiver 56 of the rectangular pallet 12 that can be engaged with the hook member 52. The hook member 52 has a shape like a rectangular plate and has a claw part 54 at the lower end. This claw part 54 is formed by cutting off the position separated from the bottom of the hook member 52 by a predetermined distance. Meanwhile, the rectangular pallet 12 has the receiver 56 with which the claw part 54 is engaged. This receiver 56 is formed by opening in a tunnel-like shape a part of a swelling part 53 rising in the peripheral groove 24 to which the protection sleeve 14 is fitted. As depicted in FIG. 7, the claw part 54 is engaged with the receiver 56 of the rectangular pallet 12. The claw part 54 fixes the rectangular pallet 12 and the protection sleeve 14 to each other. The hook member 52 can rotate so that the hook member 52 can slide on the outer surface of the protection sleeve 14 by the fixing member. As illustrated in FIG. 7, the hook member 52 is provided with a finger pocket 58 in which a finger can be put when rotating the hook member 52. The hook member 52 is rotatably fixed along the protection sleeve 14 by a shaft-fixing member 53.

As illustrated in FIG. 8(a), the shaft-fixing member 53 is for fixing the hook member 52 to the protection sleeve 14. This shaft-fixing member 53 includes a first fixing member 60 and a second fixing member 62. The first fixing member and the second fixing member are engaged with each other so that the protection sleeve 14 is placed between the members. As illustrated in FIG. 8(b), a seizing member 61 of the first fixing member 60 is seized in a diameter reduction part 63 of the second fixing member 62. Due to this seizing, the first fixing member 60 is fixed to the second fixing member 62 and the removal thereof is not allowed. Utilizing this, the hook member 52 is attached to the protection sleeve 14. In the state that the hook member 52 is attached to the protection sleeve 14, the first fixing member 60 and the hook member 52 are integrally fixed through fitting or the like.

As depicted in FIG. 1, there are provided four corner-holding members 18. Each corner-holding member 18 has a section with a shape like a letter of L, and has a plurality of cuts 121 into which the corners of the solar panels P can be inserted. The corner-holding member 18 is put on each of four corners of the piled solar panels P from the outside. The protection sleeve 14 is provided such that the corner thereof is put on the outer surface part of the piled solar panels P. The corner-holding member 18 is formed of cardboard. The thickness of the corner-holding member 18 is determined as appropriate from the viewpoint of securing the strength so that the corner-holding member 18 functions as a reinforcing member particularly when the conveyance units 10 are stacked. The upper surface of the piled solar panels P is covered with a lid part 125. On this occasion, upper end parts of the four corner-holding members 18 are inserted into the lid part 125.

The detailed description is hereinafter made of the thin panel conveyance unit 10 with the above structure, an assembly method thereof, and an operation thereof with reference to drawings. First, as depicted in FIG. 9, the cushion spacers 100 are fixed at predetermined positions of the upper surface 22 of the rectangular pallet 12. Each end surface 107 of the cushion spacer 100 is positioned along the short-side direction of the rectangular pallet 12 in contact with the inner surface of the protection sleeve 114. In this case, two cushion spacers 100 are disposed line-symmetrically with respect to a line-symmetrical axis that is parallel to the short side of the rectangular pallet 12. As a fixing method, for example, a double-sided tape may be employed. Next, as depicted in FIG. 10, the solar panel P is disposed with the surface having the power source box 101 facing upward on the load-receiving upper surfaces 113 of the two cushion spacers 100. More specifically, the solar panel P is set between stepped parts 110 provided at the end parts 108 of the cushion spacers 100. This restricts the movement of the solar panel P in the short-side direction. If the power source box overlaps with the cushion spacer 100, the positions may be adjusted in the long-side direction of the cushion spacer 100.

Then, the next two cushion spacers 100 are positioned on the corresponding cushion spacers 100. Further, the placement lower surface 106 is disposed on the upper surface 112 of the solar panel P. More specifically, at each end part 108, the protrusion 118 is fitted into the recess 119. This recess 119 is provided for the lower surface 114 of the positioning body 102 of the end part 108. Meanwhile, the protrusion 118 is provided for the upper surface 112 of the positioning body 102 of the end part 108 of the corresponding cushion spacer 100. Accordingly, the positioning body 102 protruding from the solar panel P is used as a mark and the positioning body 102 of the corresponding cushion spacer 100 to be positioned next is disposed on the mark. This facilitates the positioning of the cushion spacer 100. As a result, the positioning can be performed without the risk of causing the displacement between the cushion spacers 100 vertically adjacent to each other. Additionally, a predetermined clearance is secured between the positioning body 102 of the upper cushion spacer 100 and the positioning body 102 of the upper cushion spacer 100. While this clearance is maintained, the movement of the cushion spacer 100 on the lower cushion spacer 100 relative to the lower cushion spacer 100 in the long-side direction of the solar panel P is restricted. As a result, the positioning in the long-side direction of the solar panel P is possible. A modified example of the positioning in the long-side direction of the solar panel P is as follows. The positioning body 102 is not provided with the recess 119 or the protrusion 118. Meanwhile, the peripheral groove 24 is provided on the upper surface 22 of the rectangular pallet 12 so that the inner surface of the protection sleeve 14 abuts on the corresponding end surface 107 of the positioning body 102. Thus, by simply using the protection sleeve 14 for protecting the piled solar panels P, the end surface 107 of the positioning body 102 is brought into contact with the inner surface of the protection sleeve 14. As a result, the movement of the cushion spacer 100 in the short-side direction of the solar panel P is restricted. Furthermore, the movement of the cushion spacer 100 in the long-side direction of the solar panel P may be restricted by a friction force between the inner surface of the protection sleeve 14 and each corresponding end surface 107 of the positioning body 102. By repeating the above step, the solar panels P are piled up with the cushion spacer 100 inserted between the solar panels P vertically adjacent to each other as depicted in FIG. 11.

Next, as depicted in FIG. 12, each corner part of the piled solar panels P is fitted into the corner-holding member 18. More specifically, a lower part of the corner-holding member 18 is fitted into the peripheral groove 24 of the rectangular pallet 12. Furthermore, the corner part of the corresponding solar panel P is fitted into each cut 121. This unifies the piled solar panels P. As a result, it is possible to prevent the piled solar panels P from vibrating separately during the conveyance. A modified example of the positioning in the short-side direction of the solar panel P in this case is as follows: By utilizing each positioning body 102 protruding outward from the outer peripheral end of the piled solar panels P, the positioning body 102 may be tied up with a belt or the like in a form of having a shape like a letter of inverted U. Thus, the cushion spacers 100 are unified with the both ends protruding from the solar panel P. Therefore, each cushion spacer 100 is fastened through the positioning body 102 at each end from the outside to the inside with the belt or the like. In this manner, the positioning in the short-side direction of the solar panel P may be performed without exerting the fastening force directly on the piled solar panels P.

Next, as depicted in FIG. 13, the protection sleeve 14 is set to surround the piled solar panels P. More specifically, the lower end of the pair of protection sleeves 14 with the section shaped like a letter of U is fitted into the peripheral groove 24 of the rectangular pallet 12 in a state that the open parts of the sections shaped like a letter of U face each other. Thus, the protection sleeve 14 is fixed to the rectangular pallet 12. On this occasion, the protection sleeve 14 is locked relative to the rectangular pallet 12. In this case, the hook member 52 is rotated so that the claw part 54 is engaged with the receiver 56 of the rectangular pallet 12, thereby locking the protection sleeve 14.

Next, as depicted in FIG. 14, the lid part 125 is put on the top surface of the piled solar panels P. Thus, the conveyance unit of the solar panels P is completed. Another conveyance unit 10 may be optionally further stacked on the upper surface of the lid part 125. In this case, the corner-holding members 18 set to the four corners of the solar panels P function as the reinforcing members.

The completed conveyance unit 10 can be conveyed with the fork of the forklift inserted into a fork insertion opening 13 of the rectangular pallet 12, for example. Alternatively, the completed conveyance unit 10 can be transported in a truck. In these cases, the displacement of the piled solar panels P in the protection sleeve 14 due to the vibration resulting from the conveyance or transportation does not occur. Thus, the adjacent solar panels P can be prevented from having contact with each other to be scratched or damaged. As a result, the completed conveyance unit 10 can be conveyed or transported stably. At the destination, the panels can be unloaded according to the opposite procedure. In the case of storing the panels without being unloaded, the lower-positioned cushion spacer 100 is more likely to be crushed over time due to the weight of the solar panels P. However, the vertical shear force can be relieved as follows: A predetermined clearance is provided between the upper surface 112 of the positioning body 102 of the lower resin cushion spacer 100 and the lower surface 114 of the positioning body 102 of the upper resin cushion spacer 100 in the resin cushion spacers vertically adjacent to each other via the solar panel P. This makes it possible to relieve the vertical shear force and store the plural solar panels P for a long time stably. The conveyance unit 10 is reusable, including the rectangular pallet 12, the resin cushion spacer 100, and the corner-holding member 18.

According to the conveyance unit for the solar panel P with the above structure, the resin cushion spacers 100 are disposed at the predetermined positions of the upper surface of the conveyance rectangular pallet 12. In addition, the lower surface 114 of the solar panel P to be conveyed is supported from below with the load-receiving upper surface 112 of the resin cushion spacer 100. In this state, the solar panel P is disposed on the resin cushion spacer 100. Subsequently, the placement lower surface 106 of the next resin cushion spacer 100 is disposed on the upper surface 112 of the solar panel P. In this manner, the solar panels P are sequentially disposed. Thus, the weight of the solar panels P is supported by the resin cushion spacers 100. In this configuration, the plural solar panels P are piled up vertically. As a result, the solar panels P together with the conveyance rectangular pallet 12 can be conveyed with, for example, a forklift. In this case, the positioning body 102 is provided at the end part 108 of the resin cushion spacer 100. Thus, the resin cushion spacers 100 are adjacent to each other vertically via the solar panel P. The movement of the upper resin cushion spacer 100 relative to the lower resin cushion spacer 100 is restricted through the portion where the mutual engagement is possible between these resin cushion spacers 100. When the piled solar panels P are transported in a truck or conveyed with a forklift running on an uneven road, the vibration is transmitted. However, since the resin cushion spacer 100 is inserted between the solar panels P, such vibration is relieved while the positions of the plural solar panels P are maintained. As a result, the plural solar panels P can be conveyed safely and stably.

In the case of using such a cushioning function, when in storage, the resin cushion spacer positioned lower is more likely to be crushed over time. As a result, the vertical shear force is generated in the resin cushion spacer 100 between the portion that receives the load of the solar panel P and the end part 108 that does not receive the load of the solar panel P. This may result in that the structural integrity of the resin cushion spacer 100 is degraded over time. However, such a vertical shear force is relieved as follows: The vertical shear force is relieved by providing a predetermined clearance between the upper surface 112 of the positioning body 102 of the lower resin cushion spacer 100 and the lower surface 114 of the positioning body 102 of the upper resin cushion spacer 100 in the resin cushion spacers 100 vertically adjacent to each other via the solar panel P. As a result, the plural solar panels P can be stored stably for a long time. According to the conveyance unit for the solar panel P as above, when the solar panels P are piled up and conveyed, the scratch or damage of the solar panel P during the conveyance can be certainly prevented. Therefore, the solar panels P can be stored stably for a long time.

At least two resin cushion spacers 100 may be positioned in approximately parallel to one side of the solar panel P on predetermined positions of the upper surface of an opaque or semi-transparent solar panel P. In this case, the resin cushion spacers 100 are disposed at predetermined intervals in a direction of the other side based on the weight, rigidity, and the like of the solar panel P so that the solar panel P is not damaged by the vibration during the conveyance. In this case, the positioning body 102 provided at the end part of the lower resin cushion spacer 100 of the solar panel P protrudes outward from the other side of the solar panel P. In this configuration, the lower cushion spacers 100 of the solar panel P are positioned on the upper surface of the solar panel P at predetermined intervals. Thus, the positioning body 102 protruding from the solar panel P is used as a mark. On this mark, the positioning body 102 of the next corresponding resin cushion spacer 100 to be positioned is disposed. This facilitates the positioning of the resin cushion spacer 100. As a result, the positioning can be performed without the risk of causing the displacement between the resin cushion spacers 100 vertically adjacent to each other. Meanwhile, in the case of piling up the solar panels P without the frame on the upper surface of the pallet 12, the solar panels P are protected by being surrounded by the protection sleeve 14. Additionally, by utilizing this protection sleeve 14, the peripheral groove 24 in which the protection sleeve 14 can be fitted is provided for the upper surface 22 of the pallet 12 so that the inner surface of the protection sleeve 14 abuts on the end surface 107 of the positioning body 102. This restricts the movement of the resin cushion spacer 100 in the direction of one side thereof. As a whole, the risk of load shift during the conveyance is reduced. As a result, when the solar panels P are piled up and conveyed, the positioning of the cushion spacer 100 on the upper surface of the solar panel P becomes easy and the safe and efficient piling up becomes possible.

A second embodiment of the present invention is hereinafter described with reference to FIG. 15 and FIG. 16. In the description below, the similar components to those of the first embodiment are denoted by the similar reference symbols and the description thereof is omitted. The characteristic portion of this embodiment is hereinafter described in detail. The characteristic portion of this embodiment lies in the portions of the cushion spacers 100 vertically adjacent to each other that can be engaged with each other. As depicted in FIG. 15 and FIG. 16, the characteristic portion of this embodiment has a first protrusion 118 protruding from the upper surface 112 of the positioning body 102, and a second protrusion 123 protruding from the lower surface 114, at which a peripheral side surface 122 can be abutted on the peripheral side surface 122 of the first protrusion 118. This restricts the movement in the long-side direction of the solar panel P.

More specifically, the first protrusion 118 is an elliptical columnar body. Outside the upper surface 112, one first protrusion 118 is disposed. Further, the second protrusion 123 is an elliptical columnar body like the first protrusion 118. Two second protrusions 123 are disposed within the lower surface 114. The two second protrusions 123 are disposed at predetermined intervals via the first protrusion 118. Thus, in the resin cushion spacers 100 vertically adjacent to each other via the solar panel P, the peripheral side surface 122 of the first protrusion 118 protruding from the upper surface 112 of the lower resin cushion spacer 100 can be abutted on each of the peripheral side surfaces 122 of the two second protrusions 123 protruding from the lower surface 114 of the upper resin cushion spacer 100. Therefore, the movement of the upper resin cushion spacer 100 in the long-side direction of the solar panel P relative to the lower resin cushion spacer 100 can be restricted. In this case, the heights of the first protrusion 118 and the second protrusions 123 are adjusted as follows. These heights are adjusted so that a predetermined clearance is provided between the top of the first protrusion 118 protruding from the upper surface 112 of the lower resin cushion spacer 100 and the lower surface 114 of the upper resin cushion spacer 100. Additionally, these heights are adjusted so that a predetermined clearance is provided between the top of the second protrusions 123 protruding from the lower surface 114 of the upper resin cushion spacer 100 and the upper surface 112 of the lower resin cushion spacer 100. The predetermined clearance preferably has approximately the same size as the clearance between the upper surface 112 of the lower resin cushion spacer 100 and the lower surface 114 of the upper resin cushion spacer 100. Note that the first protrusion 118 may be disposed inside the upper surface 112 and the second protrusions 123 may be disposed outside the lower surface 114. Alternatively, the first protrusion 118 may be disposed protruding downward from the lower surface 114 and the second protrusions 123 may be disposed protruding upward from the upper surface 112.

Although the embodiments of the present invention have been described in detail so far, various modifications and changes can be made by a person skilled in the art without departing from the scope of the present invention.

For example, in this embodiment, the positioning of the piled solar panels P is performed as follows: The cushion spacer 100 is inserted between the solar panels P, and then the plural cushion spacers 100 are piled up in a columnar shape. In the cushion spacers vertically adjacent to each other, therefore, it results in restriction of movement of the upper resin cushion spacer 100 relative to the lower resin cushion spacer 100. Thus, the positioning of the piled solar panels P is performed. However, the positioning of the piled solar panels P is not limited thereto. For example, when various kinds of thin panels are piled up, as for the particular lightweight thin panel, the position on which the cushion spacer 100 is disposed on the upper surface 112 may be restricted. In this case, the cushion spacer 100 may be disposed at a different position from the lower cushion spacer 100. As long as the positioning of the piled thin panel is secured by the protection sleeve, it is not always necessary to pile up the cushion spacers 100 successively in a columnar shape. Moreover, in this embodiment, the solar panels P are vertically piled up via the same cushion spacer 100. However, the vertical piling up of the solar panels P is not limited thereto. The cushion spacer 100 positioned lower is required to have higher strength because of supporting more solar panels P. Therefore, different cushion spacers 100 having the same external shape but different thicknesses are prepared, and the cushion spacer 100 with larger thickness may be employed as the cushion spacer positioned lower.

BRIEF DESCRIPTION OF THE DRAWINGS

FIG. 8(a) is a sectional view before the first fixing member and the second fixing member are engaged with each other; and FIG. 8(b) is a sectional view after the first fixing member and the second fixing member are engaged with each other.

REFERENCE SIGNS LIST

Figure 1:
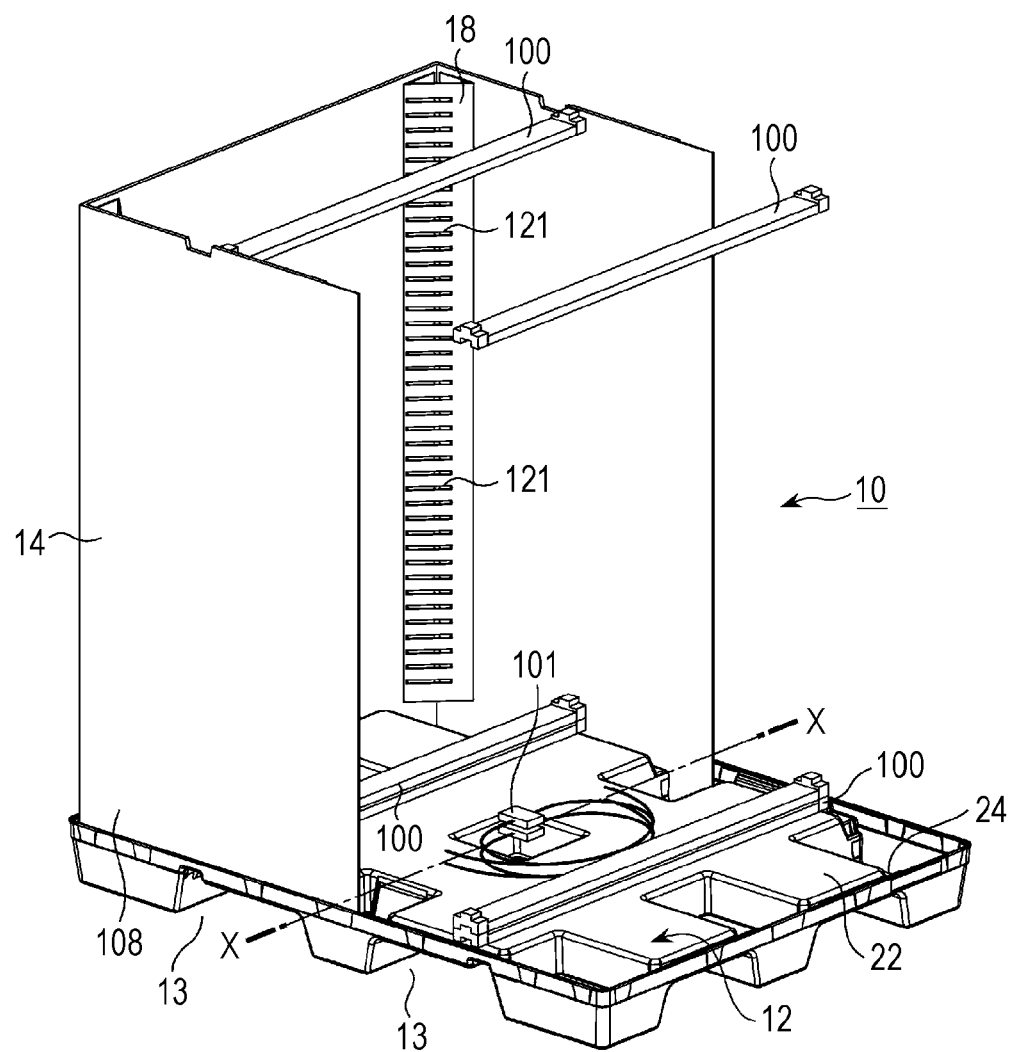
FIG. 1 is a general perspective view of a thin panel conveyance unit according to the first embodiment of the present invention.
Figure 2:
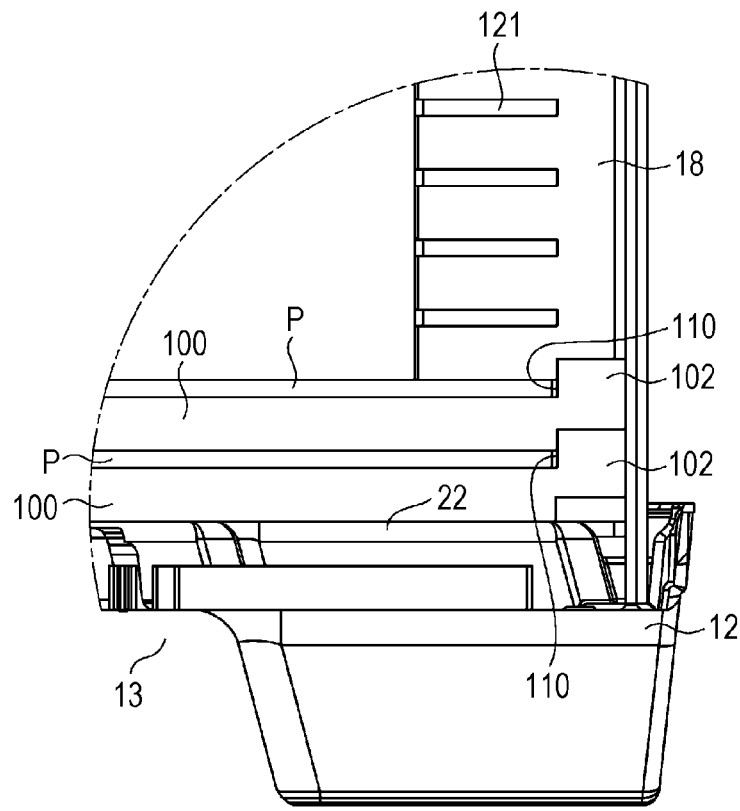
FIG. 2 is a partial sectional view along A-A of FIG. 1.
Figure 3:
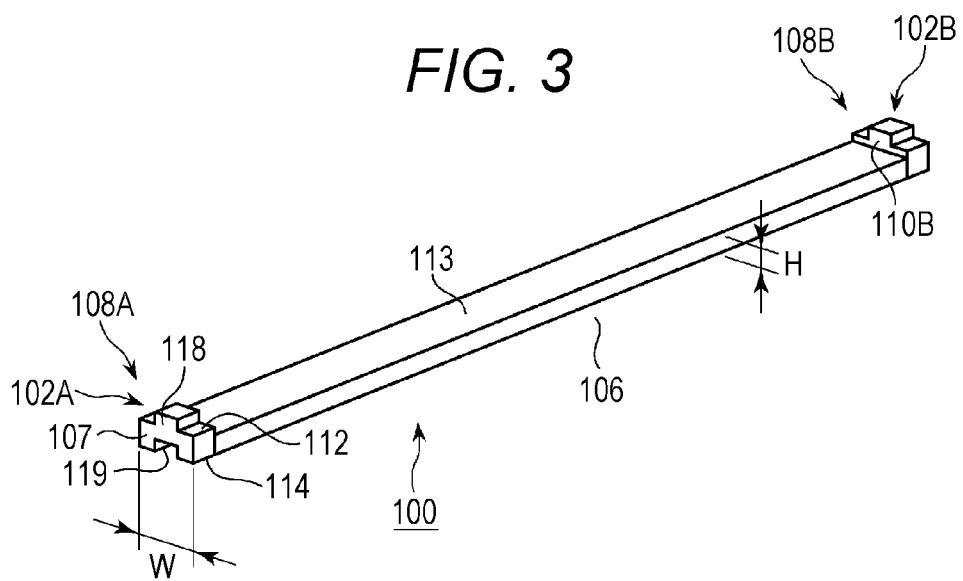
FIG. 3 is a perspective view of the cushion spacer 100 of the thin panel conveyance unit according to the first embodiment of the present invention.
Figure 4:
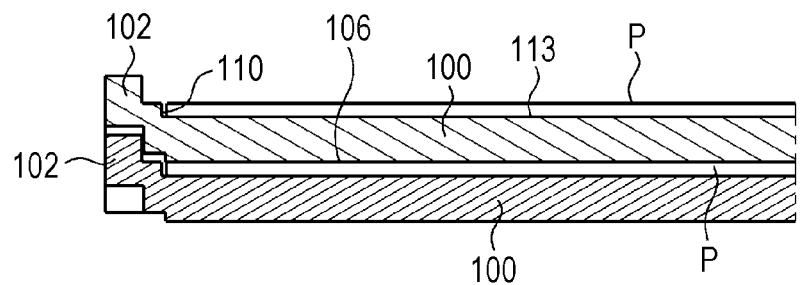
FIG. 4 is a partial sectional view depicting a state in which the cushion spacers 100 of the thin panel conveyance unit according to the first embodiment of the present invention are piled up.
Figure 5:
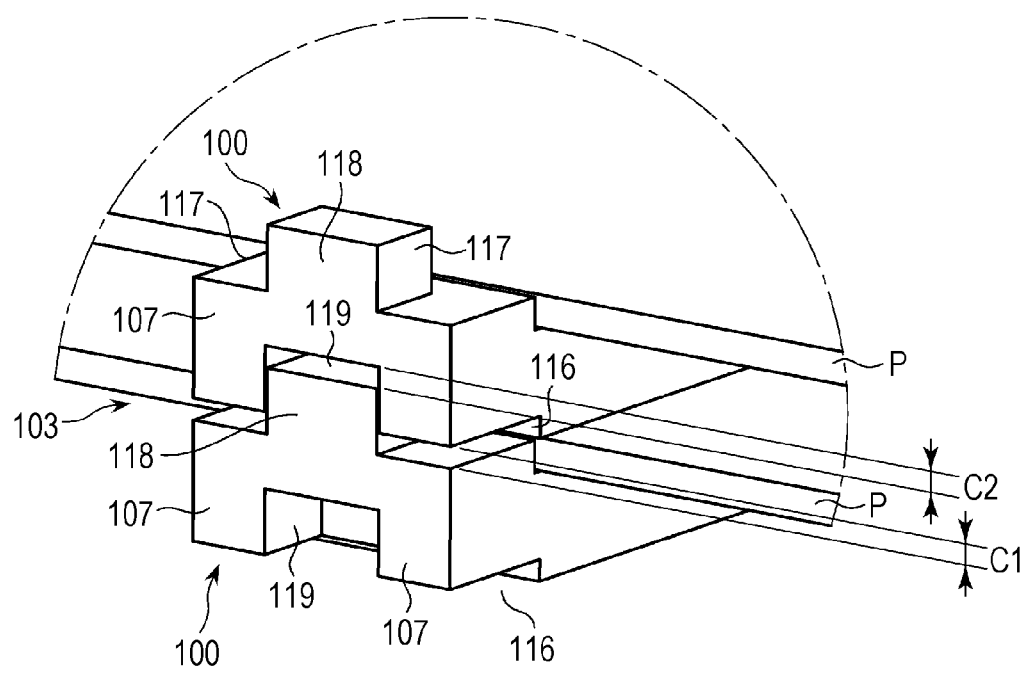
FIG. 5 is a partial perspective view around the end part of the cushion spacer 100 of the thin panel conveyance unit according to the first embodiment of the present invention.
Figure 6:
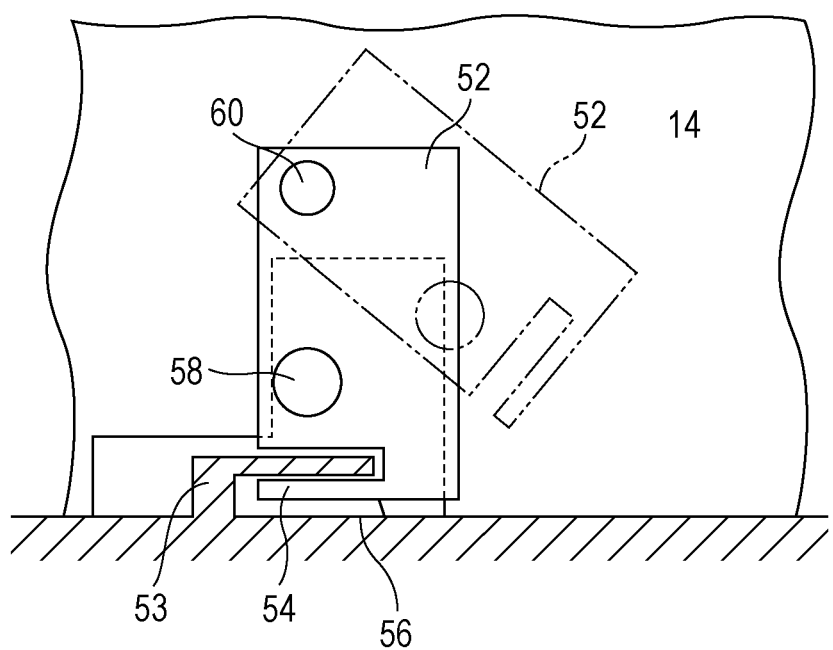
FIG. 6 is a partial magnified view around the hook member of the thin panel conveyance unit according to the first embodiment of the present invention.
Figure 7:
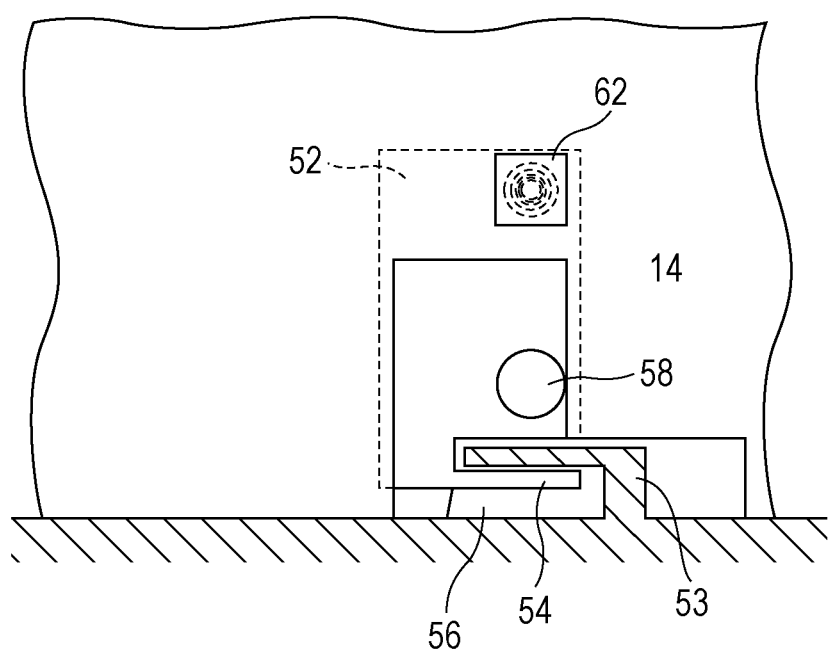
FIG. 7 is a partial magnified view seen from the opposite side via the protection sleeve in FIG. 6.
Figure 8:
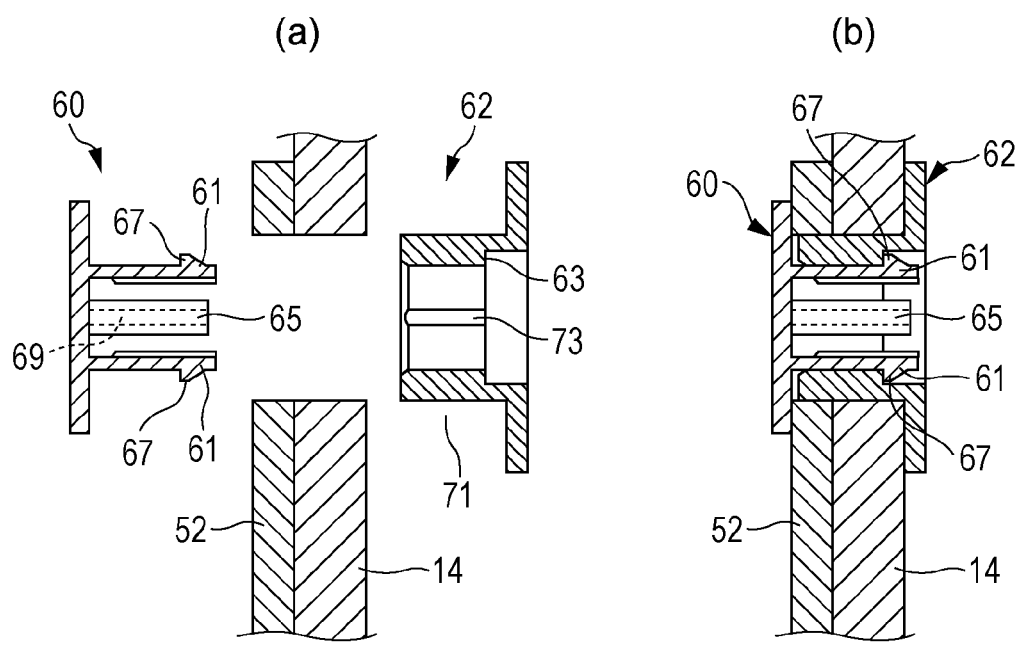
FIG. 8 are sectional views depicting the state in which the hook member according to this embodiment is fixed to the protection sleeve.
Figure 9:
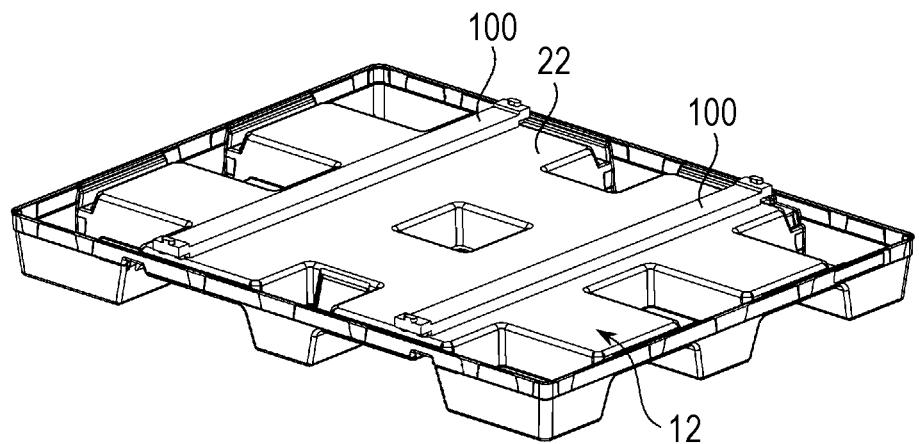
FIG. 9 is a perspective view depicting the situation in which the cushion spacer 100 is disposed in the rectangular pallet of the thin panel conveyance unit according to the first embodiment of the present invention.
Figure 10:
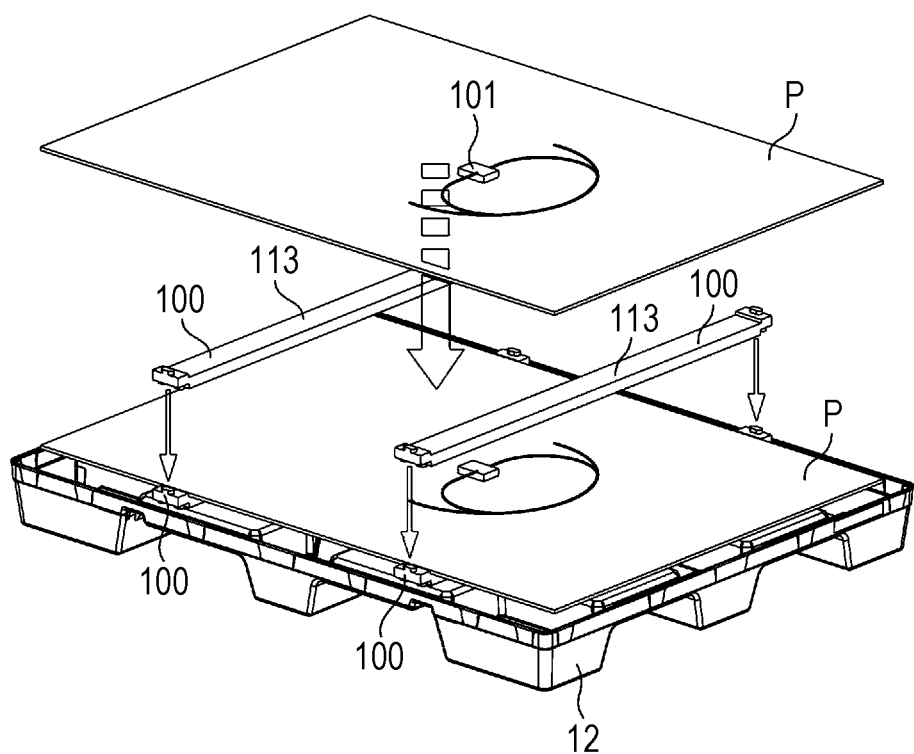
FIG. 10 is a perspective view depicting the situation in which the solar panel P is disposed on the cushion spacer 100 of the thin panel conveyance unit according to the first embodiment of the present invention.
Figure 11:
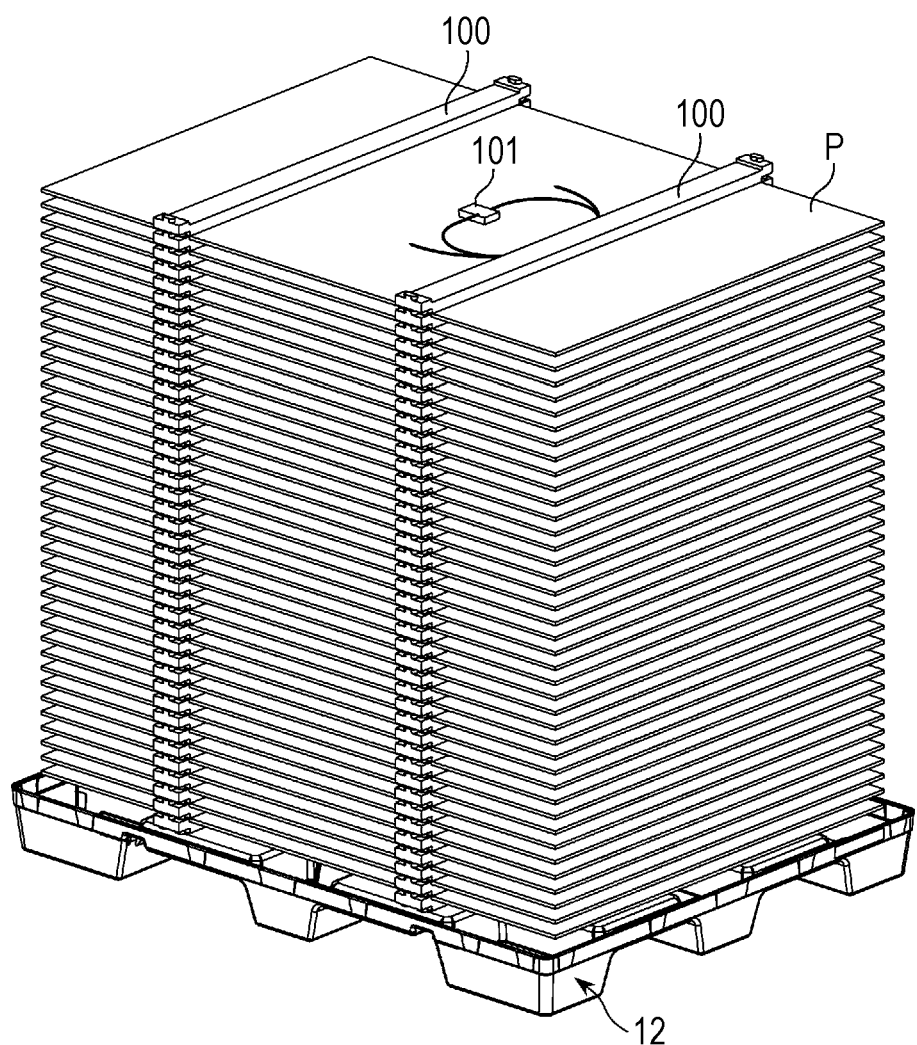
FIG. 11 is a perspective view depicting the situation in which the solar panel P is piled up on the cushion spacer 100 of the thin panel conveyance unit according to the first embodiment of the present invention.
Figure 12:
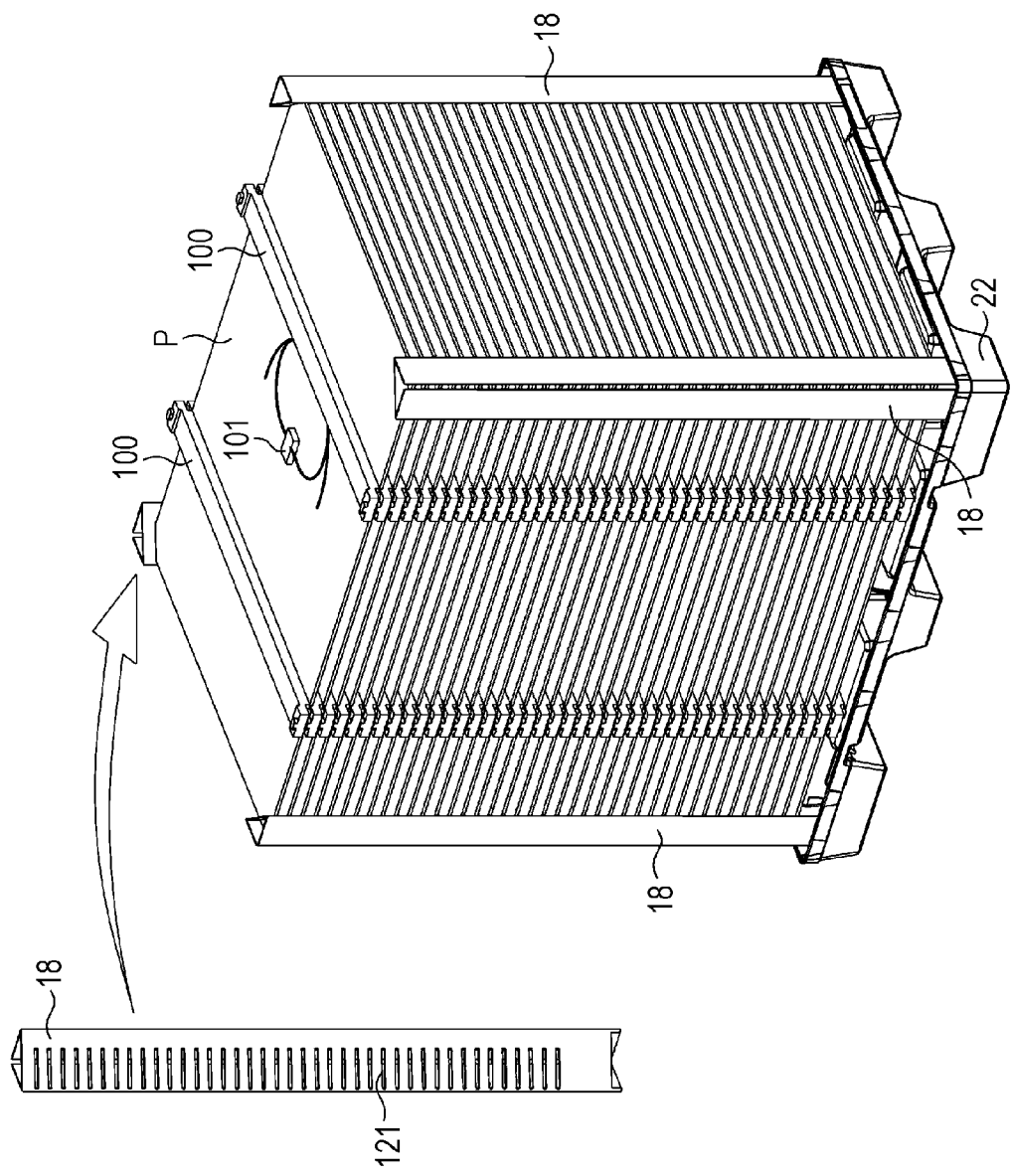
FIG. 12 is a perspective view depicting the situation in which the corner-holding member is set to each corner part of the piled solar panels P in the thin panel conveyance unit according to the first embodiment of the present invention.
Figure 13:
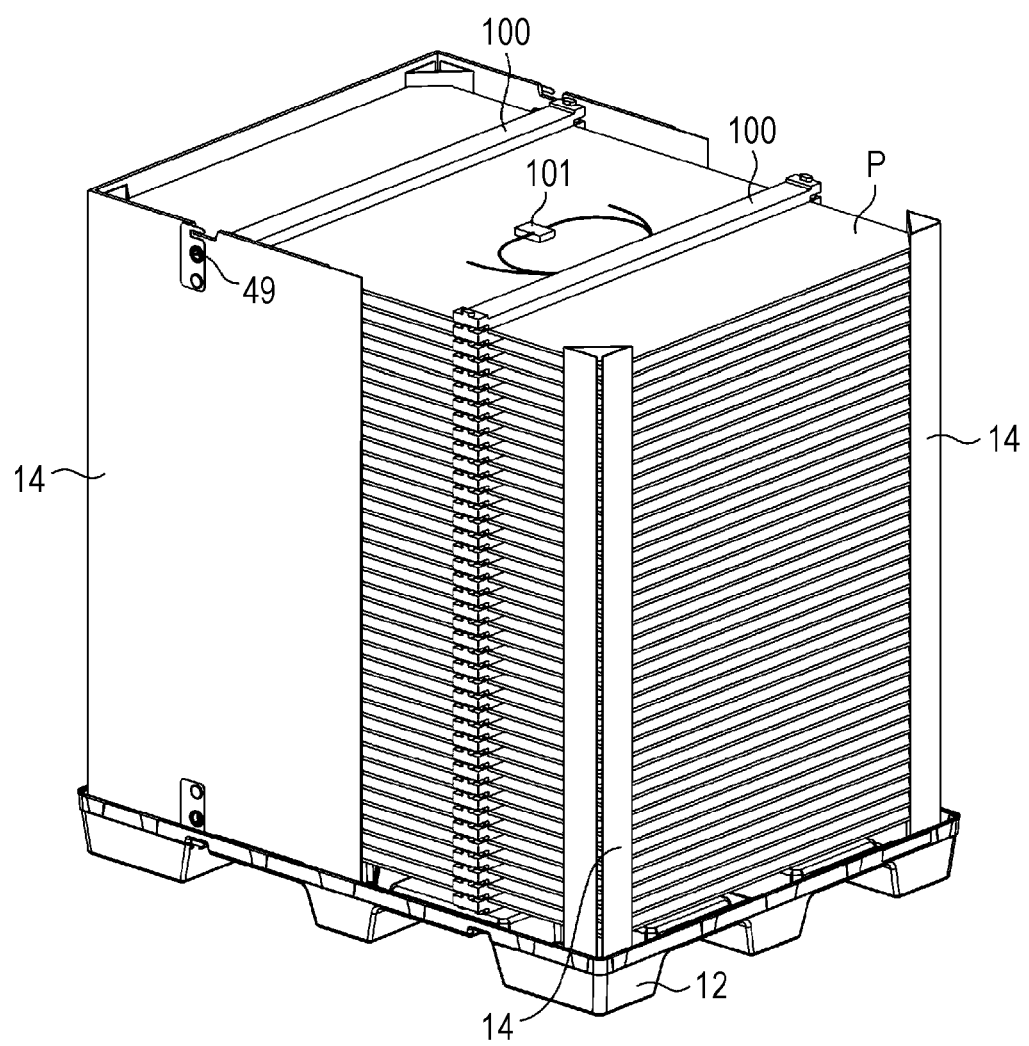
FIG. 13 is a perspective view depicting the situation in which the protection sleeve is disposed around the piled solar panels P in the thin panel conveyance unit according to the first embodiment of the present invention.
Figure 14:
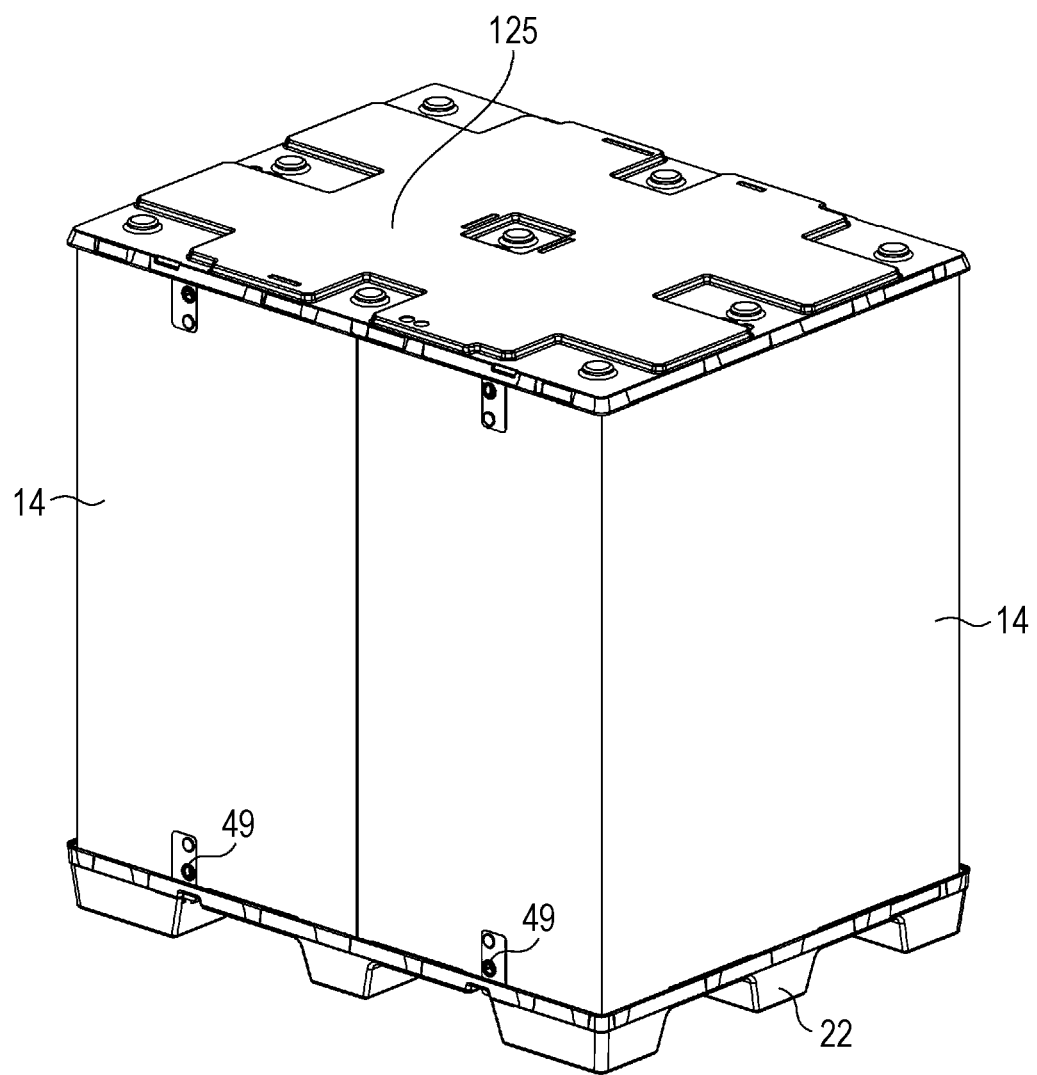
FIG. 14 is a perspective view depicting the situation in which a cap is placed on the top surface of the piled solar panels P in the thin panel conveyance unit according to the first embodiment of the present invention.
Figure 15:
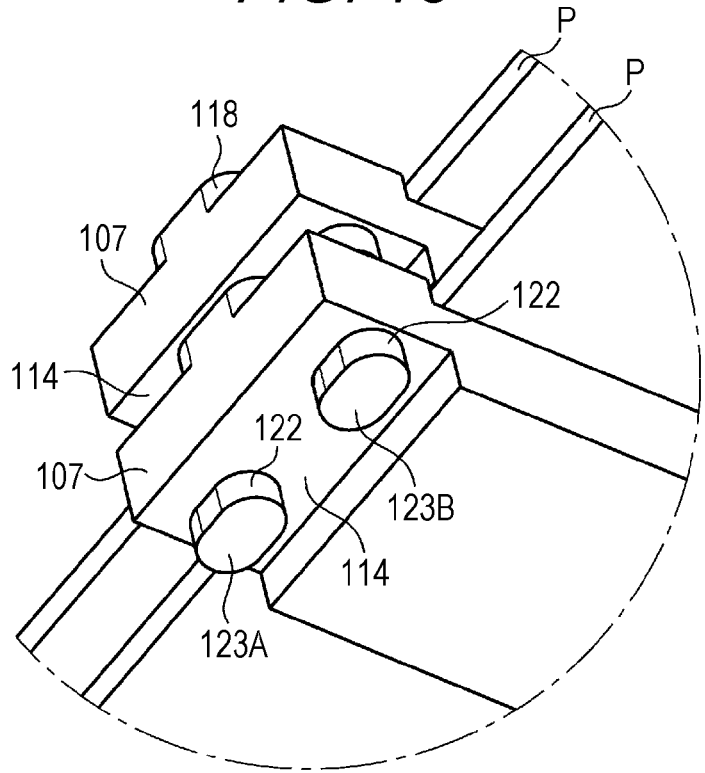
FIG. 15 depicts the cushion spacer 100 of the thin panel conveyance unit according to the second embodiment of the present invention, which is similar to FIG. 4.
Figure 16:
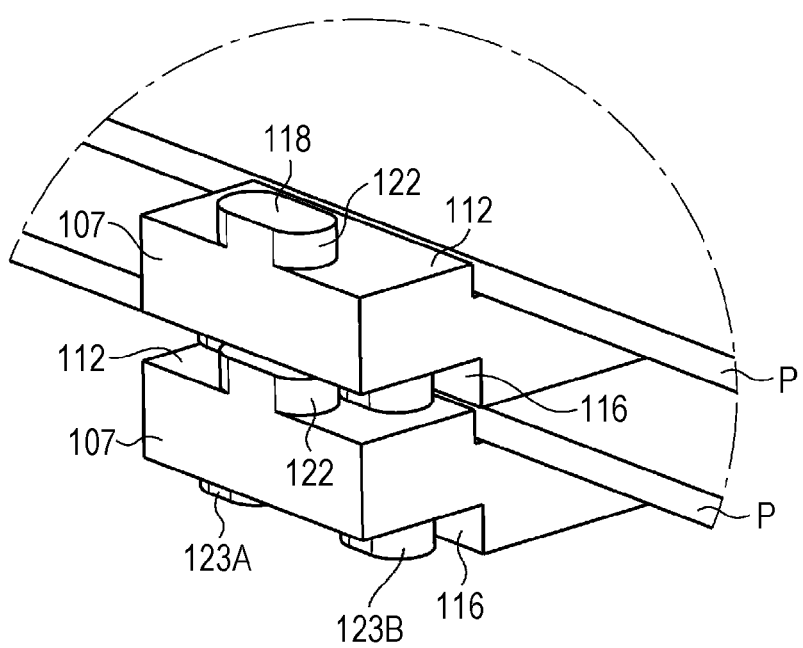
FIG. 16 is a diagram seen from below in FIG. 15.

P solar panel
10 thin panel conveyance unit
12 rectangular pallet
14 protection sleeve
18 corner-holding member
22 upper surface
24 peripheral groove
100 cushion spacer
101 power source box
102 positioning body
106 placement lower surface
107 end surface
108 end part
110 stepped part
112 upper surface
113 load-receiving upper surface
114 lower surface
116 recess
118 protrusion
119 recess
121 cut
122 peripheral side surface
125 lid part

The invention claimed is:

1. A thin panel conveyance unit used for piling up and conveying a plurality of rectangular thin panels, comprising:
resin cushion spacers inserted between the rectangular thin panels, each resin cushion spacer having a load-receiving upper surface configured to receive load of the rectangular thin panel disposed above and a placement lower surface configured to be placed on an upper surface of the rectangular thin panel disposed below, and having an end part provided with a positioning body for the resin cushion spacer;
a pallet having an upper surface configured to allow the rectangular thin panels to be piled up thereon;

a protection sleeve configured to surround the piled rectangular thin panel; and at least two resin cushion spacers configured to be inserted between the rectangular thin panels, wherein:

the upper surface of the pallet is provided with a peripheral groove in which the protection sleeve is fitted;

each resin cushion spacer has a long narrow shape and is longer than one side of the rectangular thin panel; and the upper surface of the pallet is provided with the peripheral groove in which the protection sleeve can be fitted so that an inner surface of the protection sleeve abuts on an end surface of the positioning body.

2. The thin panel conveyance unit according to claim 1, wherein:

each end part is provided with the positioning body for the resin cushion spacer;

the load-receiving upper surface and the placement lower surface are provided between the positioning bodies;

a predetermined clearance is provided between an upper surface of the positioning body of the lower resin cushion spacer and a lower surface of the positioning body of the upper resin cushion spacer in the resin cushion spacers vertically adjacent to each other via the rectangular thin panel; and the at least two resin cushion spacers are positioned on the upper surface of the rectangular thin panel at predetermined, intervals in a direction of the other side in a manner that the positioning body protrudes outward in approximately parallel to one side of the rectangular thin panel from the opposite other sides.

3. A thin panel conveyance unit used for piling up and conveying a plurality of rectangular thin panels, comprising:

resin cushion spacers inserted between the rectangular thin panels, each resin cushion spacer having a load-receiving upper surface configured to receive load of the rectangular thin panel disposed above and a placement lower surface configured to be placed on an upper surface of the rectangular thin panel disposed below, and having an end an provided with a positioning body for the resin cushion spacer;

a pallet having an upper surface configured to allow the rectangular thin panels to be piled up thereon; and a protection sleeve configured to surround the piled rectangular thin panel, wherein:

the upper surface of the pallet is provided with a peripheral groove in which the protection sleeve can be fitted;

the resin cushion spacer has a long narrow shape and is longer than a short side of the rectangular thin panel; and the positioning bodies of the resin cushion spacers vertically adjacent to each other via the rectangular thin panel have a portion where mutual engagement is possible and a predetermined clearance is provided between an upper surface of the positioning body of the lower resin cushion spacer and a lower surface of the positioning body of the upper resin cushion spacer.

4. The thin panel conveyance unit according to claim 3, wherein:

each end part is provided with the positioning body for the resin cushion spacer; and the load-receiving upper surface and the placement lower surface are provided between the positioning bodies.

5. The thin panel conveyance unit according to claim 3, wherein the upper surface of the pallet is provided with the peripheral groove in which the protection sleeve can be fitted so that an inner surface of the protection sleeve abuts on an end surface of the positioning body.

6. The thin panel conveyance unit according to claim 2, wherein:

an end part of the load-receiving upper surface is provided with a stepped part that can be abutted on a side surface of the rectangular thin panel to restrict movement in a short-side direction of the rectangular thin panel;

the upper surface of the positioning body is provided outside the stepped part; and the lower surface is provided with a recess recessed upward from the placement lower surface.

7. The thin panel conveyance unit according to claim 1, wherein:

an end part of the load-receiving upper surface is provided with a stepped part that can be abutted on a side surface of the rectangular thin panel to restrict movement in a short-side direction of the rectangular thin panel;

the upper surface of the positioning body is provided outside the stepped part; and the upper surface is provided with a recess recessed downward from the load-receiving upper surface.

8. The thin panel conveyance unit according to claim 1, wherein:

the portion where mutual engagement is possible includes a protrusion protruding from the upper surface or the lower surface of the positioning body and a recess recessed from the lower surface or the upper surface of the positioning body, the protrusion and the recess being able to engage with each other to restrict movement in a long-side direction of the rectangular thin panel; and height of the protrusion and/or the recess is adjusted so that a predetermined clearance is provided, between a top of the protrusion and a bottom of the recess at the engagement.

9. The thin panel conveyance unit according to claim 1, wherein:

the portions that can engage with each other include a first protrusion protruding from the upper surface or the lower surface of the positioning body and a second protrusion protruding from the upper surface or the lower surface, a peripheral side surface of the second protrusion being able to abut on a peripheral side surface of the first protrusion to restrict movement in a long-side direction of the rectangular thin panel; and heights of the first protrusion and the second protrusion are adjusted so that a predetermined clearance is provided in the resin cushion spacers vertically adjacent to each other via the rectangular thin panel, between a top of the first protrusion protruding from the upper surface of the lower resin cushion spacer or the lower surface of the lower resin cushion spacer and the lower surface of the upper resin cushion spacer or the upper surface of the lower resin cushion spacer and between a top of the second protrusion protruding from the lower surface of the upper resin cushion spacer or the upper surface of the lower resin cushion spacer and the upper surface of the lower resin cushion spacer or the lower surface of the upper resin cushion spacer.

10. The rectangular thin panel conveyance unit according to claim 1, wherein the cushion spacer is made of foamed resin by solid integral molding and has an expansion ratio of such a degree that a desired cushioning function is exerted on the rectangular thin panel.

11. The rectangular thin panel conveyance unit according to claim 1, wherein:

the cushion spacer includes a pair of thermoplastic resin plates;

peripheral parts of the pair of thermoplastic resin plates are attached to each other to form a side peripheral surface with a sealed hollow portion therein;

each of the pair of thermoplastic resin plates has a plurality of dents in an outer surface, where the dents taper down inwardly to project on an inner surface side;

the dents have butt planar portions at the narrowest portion;

the pair of thermoplastic resin plates is welded to each other in a manner that the planar portions of the corresponding dents are disposed back to back, thereby forming an annular rib extending between the both plates; and the number of, and/or thickness of the annular ribs is determined to such a degree that a desired cushioning, function is exerted on the rectangular thin panel.

12. The rectangular thin panel conveyance unit according to claim 2, wherein the rectangular thin panel is a solar panel and the predetermined clearance is 5 mm or less.

13. The rectangular thin panel conveyance unit according to claim 1, wherein at least two cushion spacers are disposed line-symmetrically with respect to a line-symmetric axis that is parallel to a short-side direction of the rectangular thin panel.

14. The thin panel conveyance unit according to claim 3, wherein:

an end part of the load-receiving upper surface is provided with a stepped part that can be abutted on a side surface of the rectangular thin panel to restrict movement in a short-side direction of the rectangular thin panel;

the upper surface of the positioning body is provided outside the stepped part; and the lower surface is provided with a recess recessed upward from the placement lower surface.

15. The thin panel conveyance unit according to claim 3, wherein:

an end part of the load-receiving upper surface is provided with a stepped part that can be abutted on a side surface of the rectangular thin panel to restrict movement in a short-side direction of the rectangular thin panel;

the upper surface of the positioning body is provided outside the stepped part; and the upper surface is provided with a recess recessed downward from the load-receiving upper surface.

16. The thin panel conveyance unit according to claim 3, wherein:

the portion where mutual engagement is possible includes a protrusion protruding from the upper surface or the lower surface of the positioning, body and a recess recessed from the lower surface or the upper surface of the positioning body, the protrusion and the recess being, able to engage with each other to restrict movement in a long-side direction of the rectangular thin panel; and height of the protrusion and/or the recess is adjusted so that a predetermined clearance is provided between a top of the protrusion and a bottom of the recess at the engagement.

17. The thin panel conveyance unit according to claim 3, wherein:

the portions that can engage with each other include a first protrusion protruding front the upper surface or the lower surface of the positioning body and a second protrusion protruding from the upper surface or the lower surface, a peripheral side surface of the second protrusion being able to abut on a peripheral side surface of the first protrusion to restrict movement in a long-side direction of the rectangular thin panel; and heights of the first protrusion and the second protrusion are adjusted so that a predetermined clearance is provided in the resin cushion spacers vertically adjacent to each other via the rectangular thin panel, between a top of the first protrusion protruding from the upper surface of the lower resin cushion spacer or the lower surface of the lower resin cushion spacer and the lower surface of the upper resin cushion spacer or the upper surface of the lower resin cushion spacer and between a top of the second protrusion protruding from the lower surface of the upper resin cushion spacer or the upper surface of the lower resin cushion spacer and the upper surface of the lower resin cushion spacer or the lower surface of the upper resin cushion spacer.

18. The rectangular thin panel conveyance unit according to claim 3, wherein the cushion spacer is made of foamed resin by solid integral molding and has an expansion ratio of such a degree that a desired cushioning function is exerted on the rectangular thin panel.

19. The rectangular thin panel conveyance unit according to claim 3, wherein:

the cushion spacer includes a pair of thermoplastic resin plates;

peripheral parts of the pair of thermoplastic resin plates are attached to each other to form a side peripheral surface with a sealed hollow portion therein;

each of the pair of thermoplastic resin plates has a plurality of dents in an outer surface, where the dents taper down inwardly to project on an inner surface side;

the dents have butt planar portions at the narrowest portion;

the pair of thermoplastic resin plates is welded to each other in a manner that the planar portions of the corresponding dents are disposed back to back, thereby forming an annular rib extending between the both plates; and the number of, and/or thickness of the annular ribs is determined, to such a degree that a desired cushioning function is exerted on the rectangular thin panel.

* * * * *